United States Patent
Powers

(10) Patent No.: US 11,651,081 B1
(45) Date of Patent: May 16, 2023

(54) SYSTEMS AND METHODS OF APPLICATION LAYER SECURITY

(71) Applicant: ARCHITECTURE TECHNOLOGY CORPORATION, Eden Prairie, MN (US)

(72) Inventor: Judson Powers, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 309 days.

(21) Appl. No.: 16/891,559

(22) Filed: Jun. 3, 2020

(51) Int. Cl.
*G06F 21/57* (2013.01)
*G06N 20/00* (2019.01)

(52) U.S. Cl.
CPC .......... *G06F 21/577* (2013.01); *G06N 20/00* (2019.01); *G06F 2221/033* (2013.01)

(58) Field of Classification Search
CPC .............................. G06F 21/577; G06N 20/00
USPC .......................................................... 726/25
See application file for complete search history.

(56) References Cited

U.S. PATENT DOCUMENTS

| | | | | |
|---|---|---|---|---|
| 6,230,312 B1* | 5/2001 | Hunt | ....................... | G06F 9/465 719/331 |
| 10,489,274 B2* | 11/2019 | Stern | ................... | G06F 11/3652 |
| 11,238,163 B1* | 2/2022 | Shih | ...................... | G06F 21/577 |
| 2010/0293407 A1* | 11/2010 | Locasto | .............. | G06F 11/3672 714/2 |
| 2016/0105308 A1* | 4/2016 | Dutt | ...................... | H04L 41/083 706/19 |
| 2017/0329289 A1* | 11/2017 | Kohn | ....................... | F24F 11/46 |
| 2018/0322004 A1* | 11/2018 | Jain | ..................... | G06F 11/3476 |
| 2019/0052664 A1* | 2/2019 | Kibler | .................... | H04L 63/20 |
| 2020/0110588 A1* | 4/2020 | Barton | ................... | G06N 20/00 |
| 2020/0236122 A1* | 7/2020 | Ott | ...................... | H04L 63/1408 |

OTHER PUBLICATIONS

Architecture Technology Corporation, Proposal No. N192-118, N192-118-0034, Jul. 1, 2019, 20 pages.

* cited by examiner

*Primary Examiner* — Dant B Shaifer Harriman
(74) *Attorney, Agent, or Firm* — Foley & Lardner LLP

(57) ABSTRACT

A computer-implemented method of securing vulnerabilities in a program, the method including receiving, by a computer, state information generated by an executed application program, training, by the computer, a constraints model based on the state information, generating, by the computer, one or more constraints with the constraints model, each of the one or more constraints describing an execution constraint for executing the application program, wherein the execution constraint enforces an intended operation of the application program, and applying, by the computer, the one or more constraints to the application program.

18 Claims, 4 Drawing Sheets

SYSTEMS AND METHODS OF APPLICATION LAYER SECURITY

TECHNICAL FIELD

This application generally relates to cyber defense tools and techniques, including dynamically identifying and generating application-layer constraints that enforce secure execution of software applications.

BACKGROUND

Software tools are often used to identify potential vulnerabilities in software systems. The security and operational integrity of software systems may be compromised by such vulnerabilities. It can be helpful to identify and mitigate such vulnerabilities. For example, developers may identify software bugs in software systems and push updates to the software systems to eliminate the software bugs. Existing systems may not facilitate automated vulnerability identification for an application layer of a software system.

What is needed is a means to secure an application layer of a software system. Software systems such as an application program often include flaws that cause the software system to behave in an unexpected manner. Various countermeasures exist to mitigate such flaws. However, existing countermeasures fail to address business logic vulnerabilities associated with an application layer of a software system. Existing countermeasures and software systems often interpret such vulnerabilities as "normal operation." Business logic vulnerabilities may be avoided through various means, such as rigorous testing. However, such efforts are often limited by resources and therefore producing provably secure software systems (e.g., those without business logic vulnerabilities, etc.) is extremely difficult.

SUMMARY

For at least the shortcomings discussed above, there is a need for systems and methods to automatically identify business logic vulnerabilities in application programs and mitigate such vulnerabilities whenever a device executes such application programs. This disclosure addresses the technological shortcomings in the art as mentioned above and may also offer additional or alternative benefits. In particular, described herein are systems and methods that facilitate secure execution of software application. For example, embodiments described herein may automatically identify business logic vulnerabilities in application programs using machine state information, and mitigate such vulnerabilities by generating execution constraints configured to inhibit damaging or exploitable machine states whenever a device executes an application program. The systems and methods of the present disclosure facilitate automatic detection of application layer vulnerabilities arising when device execute a software application, which are used to generate execution constraints to mitigate or eliminate such vulnerabilities. Moreover, systems and methods herein provide for downstream deployment of generated security constraints to computing devices that will execute the software application, such that the security constraints are implemented by the computing devices, thereby securing an application layer of the computing device.

In one embodiment, a computer-implemented method of securing vulnerabilities in a program comprises receiving, by a computer, state information generated by an application program; training, by the computer, a constraints model based on the state information during execution of the application program; generating, by the computer, one or more constraints with the constraints model, each of the one or more constraints containing an execution constraint having a machine-readable instruction that prevents the application program from instructing the machine to deviate from a normal operation; and applying, by the computer, the one or more constraints to the application program.

In another embodiment, a system for determining security vulnerabilities associated with an application program comprises a non-transitory computer-readable storage medium having instructions stored thereon; and a processor configured to execute the instructions to: receive state information generated by an application program; train a constraints model based on the state information during execution of the application program; and generate one or more constraints with the constraints model, each of the one or more constraints containing an execution constraint having a machine-readable instruction that prevents the application program from instructing the machine to deviate from a normal operation.

In yet another embodiment, a non-transitory computer-readable storage medium has instructions stored thereon that, when executed by a processor, causes the processor to receive state information comprising internal variables generated by an application program executed under normal conditions, wherein the internal variables are associated with a business logic of the application program; train a constraints model based on the state information; generate one or more constraints with the constraints model, each of the one or more constraints describing an execution constraint for executing the application program, wherein the execution constraint includes at least one of an allowable range for an internal variable, an allowable state transition sequence, or an expected state dependent internal variable value; generate executable code for a processing device running the application program based on the one or more constraints; and transmit the executable code to the processing device.

The various aspects and implementations may be combined where appropriate.

DETAILED DESCRIPTION

Figure 1:
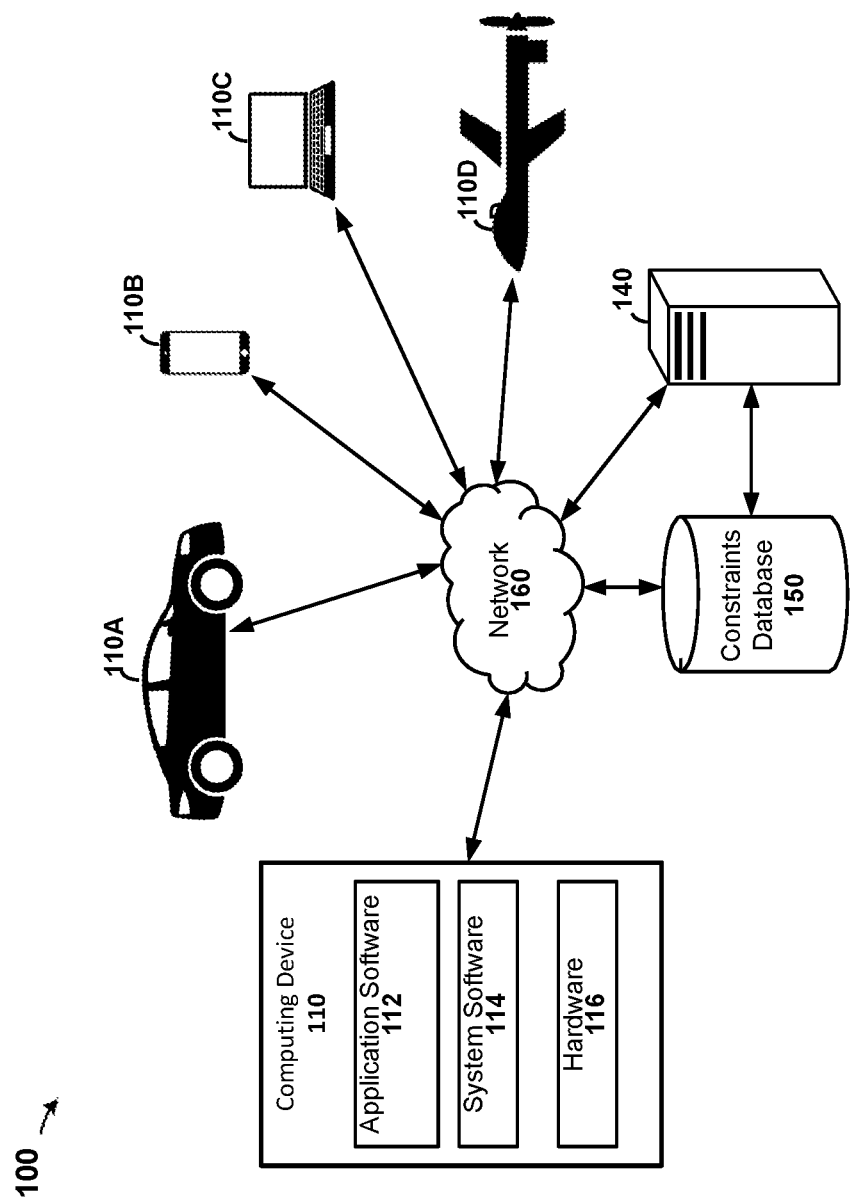
FIG. 1 is a system for securing application programs executed by a number of systems, according to an illustrative implementation.

References will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

The following are more detailed descriptions of various concepts related to, and implementations of, methods, apparatuses, and systems for identifying vulnerabilities associated with application programs, automatically generating security constraints based on the identified vulnerabilities, and applying the security constraints to the application programs. The various concepts introduced above and discussed in greater detail below may be implemented in any of numerous ways, as the described concepts are not limited to any particular manner of implementation. It would be appreciated that an application software program may include any collection of machine-executable instructions, inputs/outputs, and other components. A machine state or state information may include data in any machine or human readable format indicating prior, current, or anticipated information for aspects of the executing device; non-limiting examples of state information may include the data contents (e.g., executable instructions, memory points, data inputs/outputs, parameters, variables) in a memory (e.g., RAM, buffers, registers, hard disk), the contents or physical status of logic units (e.g., CPU, ALU, GPU, registers), or the contents or physical status of an execution pipeline or system bus, among other forms of device state information. It will be further appreciated that a secure execution constraint may include machine-readable data inputs or machine-executable instructions that constrain and/or control how a computing device executes a software application in order to inhibit and/or correct a damaging, exploitable, or otherwise undesirable machine state.

Often application programs include errors, flaws, or other faults that cause the application program to produce an incorrect or unexpected result, or to behave in an unintended manner. These errors are often called "software bugs." Software bugs generally result from mistakes and/or errors in the design or implementation of a software program. Additionally or alternatively, application programs may include business logic vulnerabilities. Business logic vulnerabilities are exploitations of the business logic of an application program. One having skill in the art would appreciate that business logic includes the machine-executed instructions and operational inputs/outputs that are executed and/or generated by a computing device when executing a software application program. Business logic vulnerabilities subvert the logic of an application program to cause undesired or unintended behavior in the application program. For example, an attacker may transmit a networking utility "ping" to a vulnerable system that exceeds the expected maximum allowable message size for the system, thereby causing the system to crash.

Various countermeasures exist to inhibit or mitigate business logic vulnerabilities arising when certain software or software instructions are executed by identifying and mitigating software bugs, malware, or other forms vulnerabilities. For example, existing software-execution controls and security vulnerability reduction programs (e.g., anti-virus software, intrusion detection systems, local firewall software) may be configured by an administrator to prevent a computing device from executing certain undesirable programs or program instructions. As an additional example of countermeasures, compiler-based defense systems may inject "checks" into the execution flow of an application program to prevent an attacker from changing the data or control flow of the application program in an unintended manner.

Existing countermeasures, however, may not be capable of identifying business logic vulnerabilities and/or preventing exploitation at the application-layer. Typical software security appliances and programs often mitigate security vulnerabilities in system software (e.g., operating system, firmware), but often not at the application layer for particular software programs. For example, anti-virus software may monitor system software, such as an operating system, to identify and terminate execution of a malware program (e.g., rootkit, worm, Trojan horse, keylogger, ransomware) based on known information about the malware program (e.g., filename), sometimes called a "signature." In similar examples, an intrusion detection system or a local firewall may monitor system software or data communications for known signatures associated with black-listed programs or communication partners. These approaches in existing countermeasures monitor and mitigate vulnerabilities at a system software or hardware level, based on signatures or pre-configured rules. Existing software security systems are typically unable to monitor and mitigate, at an application layer (e.g., mitigate business logic vulnerabilities, etc.), of a computing device.

Furthermore, existing security countermeasures typically do not facilitate dynamic monitoring of a computing device/software system. For example, as mentioned above, existing security countermeasures, such as anti-virus software, detect vulnerabilities or attacks by comparing a signature or other features associated with a software program or communication data against published or pre-configured malicious signatures or black-list of known malicious signatures. Yet, these existing countermeasures cannot dynamically identify or intuit the state of the computing device/software system to determine whether the current state of the computing device/software system makes sense given the context of the computing device/software system (e.g., "given input A, does input B make sense?").

Business logic vulnerabilities arising from executed software applications may be avoided through rigorous testing, analysis, and software specification—however, these efforts are limited by, e.g., time, resources, and the ability of human developers to anticipate possible deviations from expected behavior (e.g., unexpected user input, etc.). For example, exhaustive testing of even a relatively simple application program may involve executing the application program across a matrix of billions of possible input sequences. Therefore, provably secure application programs (e.g., those without business logic vulnerabilities, etc.) are generally prohibitively expensive to develop. Moreover, it is not always possible to fix business logic vulnerabilities once a system having an application program is deployed. For example, in an unmanned underwater vehicle (UUV) context, updates to fix business logic vulnerabilities may be impossible due to the inability to efficiently transmit high-bandwidth signals underwater. Therefore, there is a need for systems and methods to identify business logic vulnerabilities in application programs, automatically generate security constraints to mitigate and/or eliminate the vulnerabilities, and apply the security constraints to the application programs.

Systems and methods of the present disclosure relate generally to securing business logic of an application program at the application layer. More specifically, systems and methods of the present disclosure relate to unique machine learning and security constraint enforcing methodologies to (i) describe security vulnerabilities associated with application program business logic, (ii) automatically identify potential security vulnerabilities associated with application program business logic and generate security constraints addressing the identified potential security vulnerabilities, and (iii) apply the security constraints to secure the application program.

In various embodiments, systems and methods of the present disclosure improve the functioning of computer systems by automatically identifying and mitigating business logic vulnerabilities in application programs, thereby reducing an attacker's ability to exploit the application program. For example, an attacker may attempt to perform a denial-of-service (DoS) attack by sending an unexpected input to a system (e.g., a desktop/laptop computer, a car, a mobile device, an unmanned vehicle, etc.) running an application program, thereby taxing system of its re causing the system to enter a fault state and/or cease operation. The features and benefits of the present disclosure may facilitate identifying and dynamically responding to unexpected or problematic inputs (e.g., ignoring inputs, halting application execution, modifying application execution, etc.), thereby preventing DoS attacks. Moreover, in various embodiments, systems and methods of the present disclosure improve the field of software verification and validation by automatically identifying business logic vulnerabilities that human developers may not have anticipated. Further, systems and methods of the present disclosure may eliminate the need for exhaustive testing of application programs (e.g., analyzing every possible deviation from expected behavior, etc.). It should be noted that the terms "business logic" and "application logic" as used herein are interchangeable except where context dictates otherwise, and include, for example, machine-executable instructions.

Referring now to FIG. 1, system 100 for securing application programs is shown, according to an illustrative embodiment. System 100 may include one or more computing devices 110, such as commercial devices 110a-110d, security constraints server 140, and constraints database 150. In various embodiments, components of system 100 are communicably connected via network 160. Security constraints server 140 may monitor and secure commercial devices 110a-110d. For example, security constraints server 140 may receive state information from commercial devices 110a-110d, generate security constraints based on the state information, and deploy the security constraints on commercial devices 110a-110d, thereby securing an application layer of commercial devices 110a-110d.

A computing device 110 is any system, device, or component that executes an application program. Non-limiting examples of a computing device 110 may be a vehicle 110a (e.g., a car having an embedded processing circuit, etc.), an embedded processor (e.g., a motion controller, etc.), a mobile device 110b (e.g., a smartphone, etc.), a computer 110c (e.g., a desktop computer, a laptop computer, etc.), a smart device (e.g., a smart thermostat, a smart television, etc.), an autonomous vehicle 110d (e.g., an autonomous UUV, etc.), and the like.

A computing device 110 may include application software 112, system software 114, and hardware 116. Hardware 116 may include physical and low-level components of the computing device 110, such as a processing circuit having a processor and memory. For example, hardware 116 may include random-access memory (RAM), a hard disk, a central processing unit (CPU), and/or input/output (I/O) devices.

System software 114 may include or constitute machine-executable instructions that operate on, and control and manage operations of, the hardware 116. The system software 114 may include instructions that operate in between the hardware 114 and application software 112 at an application layer, and may control interactions between the hardware 114 and application software 112. For example, system software 114 may include low-level firmware, an operating system, or an interface between hardware 116 and application software 112. In operation, system software 114 may manage I/O requests or I/O data from application software 112 by translating the I/O requests into data-processing instructions for hardware 112 (e.g., CPU).

Application software 112 may include one or more application programs that run on system software 114. Non-limiting examples of application software 112 may include a word processor, a web browser, a system controller (e.g., an autonomous vehicle control system, etc.), and a navigation system, among others. In some embodiments, the application software 112 includes a user interface, which may include a command-line interface or graphical user interface (GUI), or a user interface device (e.g., a touchscreen, mouse, monitor, keyboard) that may receive inputs from a user and display information to the user. In some cases, application software 112 may function independently of an end user, such as a temperature controller in a smart thermostat.

In some embodiments, computing device 110 includes or constitutes a commercial device. For example, computing device 110 may be one of commercial devices 110a-110d. Commercial devices 110a-110d may include cars, mobile devices, computers, unmanned aerial vehicles (UAVs), and/or the like. Additionally or alternatively, commercial devices 110a-110d may include any system, device, and/or component having a processing circuit executing program instructions. For example, commercial devices 110a-110d may include an embedded proximity sensor.

Security constraints server 140 may be or include one or more servers. Each of the one or more servers may include a processing circuit having a processor and memory. The memory may have instructions stored thereon that, when executed by the processor, cause the processing circuit to perform the operations described herein. In brief summary, security constraints server 140 may monitor an operation of commercial devices 110a-110d to train a model, generate security constraints based on the model to address potential application layer vulnerabilities (e.g., business logic vulnerabilities, etc.) associated with commercial devices 110a-110d, and deploy the security constraints to commercial devices 110a-110d to mitigate and/or secure the potential application layer vulnerabilities.

Constraints database 150 may be any machine-readable storage media (e.g., RAM, magnetic hard disk) that stores constraints, constraints models, and any other data associated with business logic vulnerabilities identified in various application software 112. In operation, the constraints database 150 may receive the various forms of data (e.g., constraints, constraints models, identified vulnerabilities, state information) from a security constraints server 140. Some of the data stored in the constraints database 150 may include machine-executable instructions (e.g., an application programming interface (API) library, compiler instructions, process injection instructions, introspection hooks, etc.), which may be transmitted to, and executed by, a computing devices 110 or a security constraints server 140. For instance, constraints may comprise machine-readable inputs or executable instructions that the constraints database 150 or constraints server 140 transmit to one or more computing devices 110 to mitigate and/or secure against identified business logic vulnerabilities. In another example, constraints models may be retrieved by the constraints server 140 to update or modify the constraints model and resulting constraints. Non-limiting examples of a constraints database 150 may include but are not limited to magnetic storage, optical storage, flash storage, and RAM, among others. It should be appreciated that the constraints database 150 may be embodied on any number of computing devices (e.g., a server computer), which may include the constraints server 140 or a server in communication with the constraints server over one or more private networks.

Network 160 may include any number electronic communication networking hardware implementing one or more forms of device communications protocols. The network 160 may include any number public and/or private networks and may include the Internet, LAN, WAN, MAN, intranets, satellite networks, and other forms of device networks. Network 160 may include voice or data mobile phone communication networks, combinations thereof, or any other type of electronic communications network. Network 160 may include or constitute a public network (e.g., the Internet, etc.) and/or a private network (e.g., VPN, intranet, etc.). Components of the network 160, such as computing devices 110 or security devices (e.g., firewall, proxy server, VPN appliance), may provide secure communication between components of system 100 by implementing various secure protocols, such as transport layer security (TLS), secure sockets layer (SSL), hypertext transfer protocol secure (HTTPS), and any other secure communication protocol.

A security constraints server 140 may receive a corpus of training state information, or test state information, associated with computing devices 110 executing application software 112. In some cases, the state information may be received directly from a database or administrator device. And in some cases, the security constraints server 140 may monitor execution of application software 112 to identify and capture state information for a computing device 110 executing the application software 112. The security constraints server 140 may also receive or automatically identify business logic vulnerabilities associated with the state information and the application software 112. In operation, the security constraints server 140 may monitor or otherwise receive the state information, identify or receive business logic vulnerabilities in application software 112, and generate security constraints to mitigate the business logic vulnerabilities for downstream computing devices 110 (e.g., commercial devices 110a-110d) that will execute the application software 112. As an example, security constraints server 140 may monitor state information of application software 112 to determine an expected input length for a parameter results in a favorable machine state. So in this example, the constraints server 140 may generate a security constraint that enforces an expected input length or range for the parameter, thereby mitigating a business logic vulnerability that may exist. The constraint, as executed by the computing device 110, prevents the computing device 110 from entering into a machine state that would otherwise arise from an attacker injecting an input triggering or exposing an exploitable error in the application software 112 and/or system software 114. Additionally or alternatively, a security constraints may include an allowable or prohibited state transition sequence or series of variable/parameter values.

Figure 2:
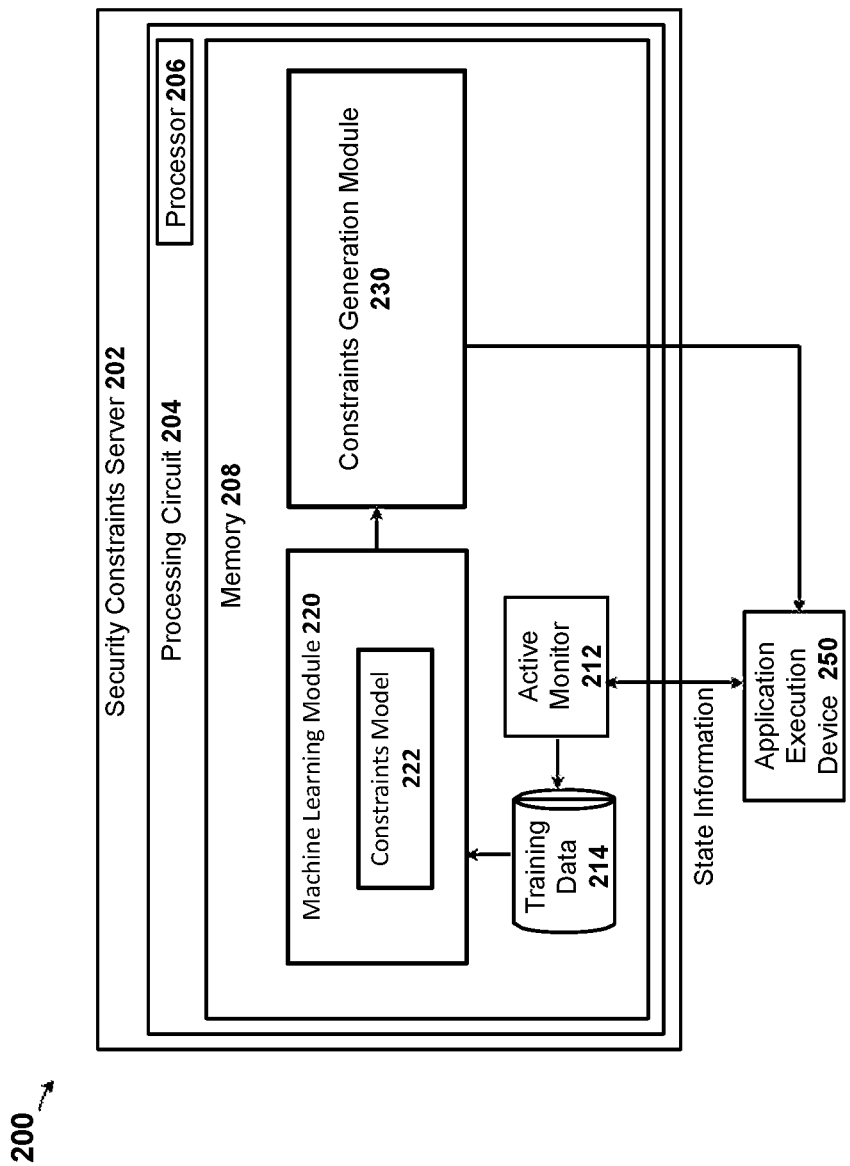
FIG. 2 is a block diagram illustrating a security constraints system for monitoring and identifying potential vulnerabilities, according to an illustrative embodiment.

FIG. 2 shows a system 200 for identifying business logic vulnerabilities associated with application execution device 250 and automatically generating security constraints based on the business logic vulnerabilities is shown, according to an exemplary embodiment. The system 200 may include a security constraints server 202 in communication with any number of application execution devices 250. It should be appreciated that an application execution device 250 may be any computing device comprising a processor and non-transitory storage and capable of executing software program applications. In some cases, application execution device 250 may be similar to computing device 110 in FIG. 1, which might include a computing device similar to one of commercial devices 110a-110d.

A security constraints server 202 is shown to include processing circuit 204 having processor 206 and memory 208. In some embodiments, the security constraints server 202 is a cloud-based processing system including one or more servers. A memory 208 may store machine-readable and machine-executable instructions that, when executed by a processor 206, cause a processing circuit 204 to perform the various operations described herein. The operations of the constraints server 202 may be implemented using software, hardware, or a combination thereof. The processor 206 may include a microprocessor, ASIC, FPGA, etc., or combinations thereof. In many implementations, processor 206 may be a multi-core processor or an array of processors. The memory 208 may include, but is not limited to, electronic, optical, magnetic, or any other storage devices capable of providing the processor 206 with program instructions. The memory 208 may include a floppy disk, CD-ROM, DVD, magnetic disk, memory chip, ROM, RAM, EEPROM, EPROM, flash memory, optical media, or any other suitable memory from which the processor 206 can read instructions. The instructions may include code from any suitable computer programming language such as, but not limited to, C, C++, C#, Java, JavaScript, Perl, HTML, XML, Python and Visual Basic.

The memory 208 is shown to include machine-readable, processor-executable computer software or firmware. The machine-readable instructions may function as various task-oriented software modules that allow the constraints server 202 to provide the various benefits operations described in this disclosure. As shown in the illustrative embodiment, the machine-readable instructions in the memory 208 include an active monitor 212, a training data database 214, a machine learning module 220, and a constraints generation module 230.

An active monitor 212 executed by the constraints server 202 may monitor application execution device 250 to collect data (e.g., state information) to train a constraints model for a certain software application program, where the constraints model is later used by other software components (e.g., constraints generation module 230) to generate security constraints. The active monitor 212 gathers state information of an application execution device 250 during runtime of the software application program. For example, the active monitor 212 may gather information associated with system memory, intercepted system calls, execution state, and/or stack traces that are associated with processes executing on application execution device 250.

The active monitor 212 enables the constraints server 202 to monitor various types of data in the memory of the execution device 250, such as pointers, variables (e.g., a variable associated with an application program, etc.), parameters (e.g., an execution stack pointer, etc.), and any other type of data associated with the application execution device 250. In some embodiments, the active monitor 212 may capture state information generated by code-execution review software during execution of the application program by the application execution device 250. One having skill in the art would recognize that code-execution testing software may be any software program configured to conduct, for example, automated testing, static code analysis, secure code testing, data-flow analysis, unit test or test-case generation and execution, runtime error detection, and the like. The code-execution testing software may be any program customized or designed for the system 200, or the testing software may be a publically available testing program (e.g., JTest, CTest, etc.). Additionally, in some embodiments, the active monitor 212 captures information from software function-hooking and/or API-hooking processes that are specific to particular functions and/or APIs executed during runtime of the application program by the application execution device 250. Additionally or alternatively, the active monitor 212 may generate wrappers and/or instrumented code for software function calls and/or API calls, as generated by the application execution device 250 during runtime.

The active monitor 212 may generate training data based on the observed or otherwise collected state information. In operation, after the active monitor 212 generates and/or receives state information associated with application execution device 250, the constraints server 202 may store at least a portion of the state information into the training data database 214 for later use as training data by a machine learning module 220. In some cases, the state information is associated with a "normal" operating state of the application execution device 250 executing an application program. The active monitor 212 may collect state information generated by the execution device 250 operating in an intended manner. The normal state information may be automatically detected based on, for example, prior state information, an output of the active monitor 212 (e.g., no error flag); or the normal state information may be manually indicated by an administrator user's input. Additionally or alternatively, the active monitor 212 may collect state information associated with an "abnormal" operating state of an application program. The active monitor 212 may collect abnormal state information generated by the execution device 250, may mimic a scenario in which the software application or execution device 250 is under attack from an attacker (e.g., an attacker targeting an application layer of the application program), or as a part of an automated or a user-generated test-case scenario. In some implementations, the active monitor 212 may be configured to monitor particular aspects of execution. For example, the active monitor may monitor the application program variables that are modified or accessed (e.g., active monitor 212 does not monitor every variable). Similarly, the active monitor 212 may monitor all aspects of the application execution device 250, or only the application program being executed by application execution device 250 during testing. The active monitor 212 may generate the state information from the application program under test by executing the automated testing software (e.g., black-box testing), such as an American fuzzy loop (AFL) fuzz tester, which may automatically generate inputs to software under test in order to elicit program and/or machine states (e.g., unexpected, abnormal, etc.) associated with the application program.

Training data database 214 may store training data based on state information associated with an application program and/or execution devices 250, as generated during testing or otherwise received from other sources. Training data database 214 may include any number of machine-readable storage mediums (e.g., hard disk). The storage mediums may include but are not limited to magnetic storage, optical storage, flash storage, and/or RAM. Training data database 214 may implement or facilitate various APIs to perform database functions (i.e., managing stored data). The APIs can be but are not limited to SQL, ODBC, JDBC, and/or any other data storage and manipulation API. Although the training data database 214 is shown in FIG. 2 as a component of the constraints server 202, it should be appreciated that the training data database 214 may be embodied in any number of additional or alternative computing devices.

A machine learning module 220 may include machine-executable software instructions the enable the constraints server 202 (or other computing device) to execute any number of machine learning algorithms. The machine learning module 220 is configured to train constraints models 222 using the data stored in the training database 214, where a constraints model 222 may be any form of machine learning model generated by a machine learning algorithm, and may be implemented when executing any number of rules-based engines and/or artificial intelligence programs. The machine learning module 220 may train the constraints model 222 (e.g., a neural network, a Bayesian model, etc.) using state information to detect and/or mitigate application layer vulnerabilities associated with an application software program when executed by an application execution device 250. In operation, the machine learning module 220 receives, as an input, training data (e.g., state information, etc.) for any number of application execution devices 250, via the training data database 214 and/or the active monitor 212; and the machine learning module 220 generates a constraints model 222 as an output. Additionally or alternatively, the machine learning module 220 may output information associated with the constraints model 222, such as particular security constraints, the associated vulnerabilities, predicted state information, and the operational parameters, among others. The machine learning module 220 may implement, for example, supervised machine learning, unsupervised machine learning, semi-supervised machine learning, reinforcement machine learning, self-learning, feature learning, sparse dictionary learning, anomaly detection, association rules learning, or the like. Additionally or alternatively, the machine learning module 220 may implement, for example, an artificial neural network, a decision tree, a support vector machine, a regression analysis system, and a Bayesian network system, among others.

A constraints model 222 may be generated and/or trained through a machine learning processes executed by the constraints server 202 or other computing device, where the constraints model 222 may be used by downstream machine-executed processes to generate security constraints. The constraints model may be trained using state information from application execution devices 250. The constraints model 222 may be or may include, for example, a statistical machine-learning model (e.g., Gaussian matrix) or neural network (e.g., convolutional neural network, autoencoder neural network). Additionally or alternatively, the constraints model 222 may be or may include an association rule learning system. For example, the constraints model 222 may include an association rule learning system configured to generate security constraints. In some embodiments, the constraints model 222 models expected behavior of an application program associated with application execution device 250 (e.g., machine state of an application program operating under "normal" conditions, machine state of an application program operation under "abnormal" conditions).

In some cases, the machine learning module 220 receives training data from training data database 214, and prepares the training data for input into a constraints model 222. To prepare the data, the machine learning module 220 may map and convert structure or unstructured training data (stored in the training data database 214) to inputs of the constraints model 222 and/or neural network. In some embodiments, the machine learning module 220 manages training of constraints model 222. In some embodiments, the machine learning module 220 identifies the training data associated with "normal" and "abnormal" states. For example, the machine learning module 220 may include an unsupervised machine-learning algorithm to identify certain training data as representing "normal" and/or "abnormal" machine states. As an additional example, the machine learning module 220 may model training data using a one-class support vector machine to automatically identify "abnormal" machine states.

In some embodiments, the machine learning module 220 receives output from the constraints model 222 and prepares the output for constraints generation module 230. For example, the machine learning module 220 may receive numerical outputs from the constraints model 222 or a neural network associated with constraints model 222, and convert the numerical output into security constraint or security constraints data to be employed by a constraints generation module 230. Additionally or alternatively, the machine learning module 220 may assemble outputs from multiple models included in a constraints model 222. For example, a constraints model 222 may include a first neural network model that generates a state condition and a second neural network model that generates a partial security constraint associated with the state condition. In this example, the machine learning module 220 may assemble the state condition and/or any security constraint data to generate security constraint data to be used when generating a constraint.

A constraints generation module 230 may receive information, such as a constraints model 222 or constraint data outputs, from the machine learning module 220 and generate security constraints using such data inputs. In some implementations, the constraints generation module 230 may also receive additional types of information that was used to generate the constraints model 222, the constraints outputs, or other types of information associated with the constraints model 222, such as state information, information describing the execution device 250, information describing the software application information, and vulnerability information, among other types of information. When executed by the security constraints server 202, the constraints generation module 230 may receive (from the machine learning module 220) the constraints model 222 or constraints data outputs generated by executing the constraints model 222. The constraints generation module 230 may perform various operations that, using one or more data inputs (e.g., constraints model 222, constraints data, training state information, test state information, software application information, application execution device 250 information), generates security constraints configured to be implemented downstream by any number of application execution devices 250 during execution.

In some embodiments, a constraints model 222 may be applied by the constraints server 202 on inputted (training or testing) state information. This may include, for example, comparing the constraints model 222 or predicted state information (as generated by the machine learning module 220), against test state information (as generated by application execution device 250), to determine whether the application execution device 250 deviates from expected operation. In some implementations, the constraints generation module 230 may generate constraints indicating or preventing machine state exposing a potential security vulnerability associated with a software application during runtime. For example, the constraints generation module 230 may receive state information data that describes an expected input size for a parameter of the application program of application execution device 250. The constraints generation module 230 may receive the predicted data as a component or an output of a constraints model 222. In some implementations, the constraints generation module 230 may generate a security vulnerability category or other form of classifying data, based on known or expected forms of data, such as received state information, expected state information (e.g., expected input size), and the software application, among others. This categorization data may be used by the constraints generation module 230 when generating the constraints for later implementation by execution devices 250.

In operation, the constraints generation module 230 executes processes to convert data outputs received from the machine learning module 220 (e.g., outputs of constraints model 222, the constraints model 222) into a machine-readable syntax for a security constraint. In some embodiments, the syntax is an if-then syntax (e.g., if state condition(s) is $A_i$, then execute constraint B). However, it should be understood that the syntax may take many forms and that the examples provided herein are non-limiting. It should be appreciated that machine state conditions may include, for example, a variable (e.g., a variable value, a range, a threshold, etc.), a parameter (e.g., an execution stack pointer, etc.), an expected value, or any other types of data. The executable constraint may include machine-executable processes, such as, for example, "checks" on inputs and state variables, invariants met by state variables, legal application state transitions, and/or other data-centric security or machine state controls. For example, the security constraints may specify that sizes (e.g., data structure sizes, string lengths, etc.) and indexes (e.g., array indexes, etc.) are expected to be small positive numbers. As an additional example, the security constraints may specify that a system that is "active" should always have a non-zero program counter and a system that is "inactive" should always have a zero program counter. As another example, the security constraints may specify that "action 2" must always occur after "action 1" and never before.

In some embodiments, the security constraints facilitate custom responses (e.g., custom mitigation, etc.) to detected application layer attacks and/or vulnerabilities (e.g., business logic vulnerabilities, etc.). For example, in response to a detected application layer attack, a first security constraint may cause an application program to terminate (e.g., halt execution, restart, etc.) and a second security constraint may cause the application program to ignore the attack and/or vulnerability (e.g., reject an improper or unexpected user input, etc.). And in some embodiments, security constraints are generated by humans (e.g., a human writes a security constraint, etc.). Additionally or alternatively, security constraints generated by constraints generation module 230 may be edited (e.g., by a human, etc.).

In some embodiments, the constraints generation module 230 generates executable instructions for application execution device 250 to implement the security constraints. It should be understood that many possible implementations schemes exist and that the examples provided herein are non-limiting. In some embodiments, constraints generation module 230 generates an API library for application execution device 250 to facilitate security checks associated with the security constraints. Additionally or alternatively, constraints generation module 230 may implement compiler software. For example, a program compiler may be used to automatically inject calls to security checks associated with the security constraints. Additionally or alternatively, constraints the generation module 230 is configured to perform process injection to inject security checks into an executable code of an application program at runtime. Additionally or alternatively, the constraints generation module 230 may perform an introspection operation. For example, the constraints generation module 230 may generate an external software component to monitor state information of an application program on application execution device 250 and prevent specific processes from executing and/or cause security processes associated with the security constraints to execute.

Figure 3:
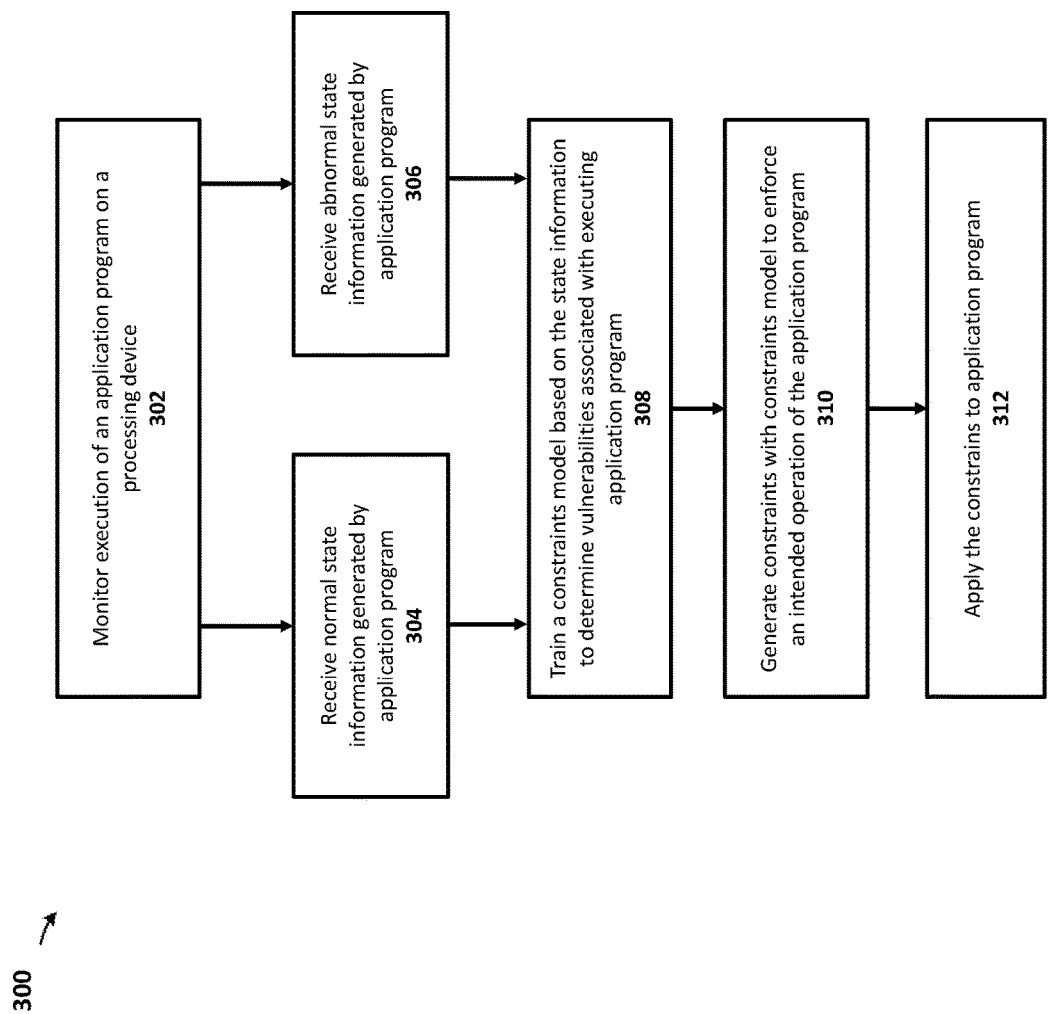
FIG. 3 is a flow diagram illustrating a method of generating security constraints for the security constraints system, according to an illustrative implementation.

Referring now to FIG. 3, process 300 for monitoring and securing an application program is shown, according to an illustrative embodiment. In various embodiments, security constraints server 202 performs process 300. At step 302, a security constraints system monitors execution of an application program on a processing device. In some embodiments, the processing device is a computer. Additionally or alternatively, the processing device may be an embedded processing device. For example, the processing device may be a processing device embedded within an autonomous UUV. Step 302 may include monitoring the application program using application hooks.

At step 304, the security constraints system receives normal state information generated by the executed application program. The state information may completely describe a current configuration of the executed application program at a point in time. For example, the state information may include an entire call stack of the executed application program and the values associated with every register of the processing device. In various embodiments, the state information is associated with an intended operation of the executed application program. At step 306, the security constraints system receives abnormal state information generated by the executed application program. In various embodiments, the state information is associated with an unintended operation of the executed application program. For example, the state information may be associated with the executed application program under attack (e.g., an attempted exploitation of business logic of the executed application program, etc.).

At step 308, the security constraints system trains a constraints model based on the state information to determine vulnerabilities associated with execution of the application program. In various embodiments, the vulnerabilities are application layer vulnerabilities (e.g., business logic vulnerabilities, etc.). In various embodiments, the constraints model is or includes a machine learning model (e.g., a neural network, etc.). For example, the security constraints system may train a neural network using state information from execution of an application program associated with an application execution device. In some embodiments, the neural network models normal operation of an application program. For example, the security constraints system may train the neural network with normal state information. In some embodiments, the security constraints system trains the machine learning model with historical values of a variable, parameter, or state associated with operation of an application program.

At step 310, the security constraints system generates one or more constraints with the constraints model to enforce an intended operation of the application program. In various embodiments, the one or more constraints are security constraints. In some embodiments, step 310 includes combining one or more outputs from the constraints model. For example, multiple constraints model outputs may be combined to generate a security constraint. In some embodiments, the constraints model generates data that is used to generate a security constraint. For example, the constraints model may generate expected state information for an application program and the security constraints system may compare the expected state information to actual state information of the application program to generate one or more security constraints. In some embodiments, step 310 includes generating executable instructions based on the one or more constraints.

At step 312, the security constraints system applies the one or more constraints to the application program. In various embodiments, step 312 includes transmitting executable instructions to the application program. For example, step 312 may include transmitting an API library, compiler instructions, process injection instructions, introspection hooks, and/or the like to the processing device. In various embodiments, the processing device executes the executable instructions to mitigate and/or defend against application layer vulnerabilities (e.g., business logic vulnerabilities, etc.). In some embodiments, the one or more constraints include an allowable range for an internal variable. Additionally or alternatively, the one or more constraints may include an allowable state transition sequence. Additionally or alternatively, the one or more constraints may include an expected state dependent internal variable value.

For example, step 312 may include applying the one or more constraints to a computer executing one or more applications (e.g., a web browser, an email client, photo editing software, etc.) to secure the one or more applications. Additionally or alternatively, step 312 may include applying the one or more constraints to an embedded processing device such as a computer embedded within a vehicle. For example, step 312 may include applying the one or more constraints to a computer embedded in an autonomous UUV to secure a control system of the autonomous UUV. As an additional example, step 312 may include applying the one or more constraints to a distributed processing system (e.g., a cloud server, etc.) running one or more applications (e.g., cloud processing applications, server management systems, etc.) to secure the one or more applications. It should be understood that other implementations not expressly contemplated herein are within the scope of the present disclosure.

Figure 4:
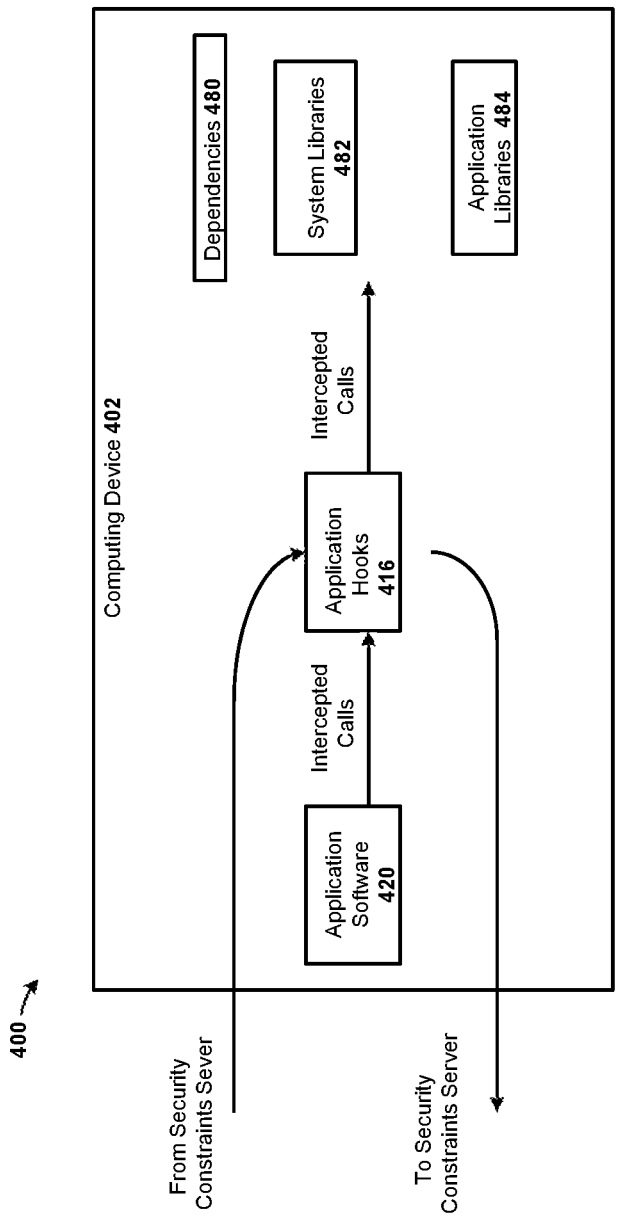
FIG. 4 is a block diagram illustrating data flow between the security constraints system and a computing device, according to an illustrative implementation.

Referring now to FIG. 4, a non-limiting example of an implementation 400 of security constraints to secure an application program is shown, according to an exemplary embodiment. Implementation 400 is shown to include computing device 402 (such as execution device 250 in FIG. 2, or computing device 110 or commercial devices 110*a*-110*d* in FIG. 1). It should be understood that while implementation 400 is described in reference to an introspection operation (e.g., using introspection hooks), other implementations are possible and implementation 400 is non-limiting. For example, as described above a security constraints server may generate security constraints as an API library, compiler instructions, process injection instructions, and/or the like. In various embodiments, computing device 402 is communicably connected to a security constrains system (such as a security constraints server 202 in FIG. 2, or server 140 in FIG. 1). Additionally or alternatively, computing device 402 is communicably connected to a database having security constraints (such as constraints database 150 in FIG. 1). In some embodiments, computing device 402 is not connected to an external system. For example, computing device 402 may be an autonomous UUV having security constraints loaded thereon.

The illustrative embodiment in FIG. 4 shows the deployment of security constraints to computing device 402 (e.g., sending security constraints to computing device 402 for execution). Additionally or alternatively, implementation 400 may include processes for monitoring computing device 402 to collect state information. For example, a constraints server may collect state information from computing device 402 to train a constraints model.

The computing device 402 is shown to include application software 420, application hooks 416, and dependencies 480. In various embodiments, application software 420. For example, application software 420 may include a media player, a file viewer, a simulator, a control system (e.g., a traction control system (TCS), an autonomous vehicle control system, a process controller, a temperature controller, etc.), an embedded program, and/or any other software having and/or constituting an application layer. Dependencies 480 may include additional code and/or resources used by application software 420. For example, dependencies 480 may include libraries used by application software 420. As an additional example, dependencies 480 may include system (e.g., operating system level, kernel level, etc.) functions used by application software 420.

Application hooks 416 may be generated by an external system (e.g., security constraints server) and deployed to computing device 402. In various embodiments, the application hooks 416 intercept calls (e.g., system calls, library calls, etc.) from application software 420 and transmit the intercepted calls to an external system (e.g., security constraints server). Additionally or alternatively, the application hooks 416 may inject calls into computing device 402. For example, the application hooks 416 may provide wrappers and/or instrumented code for corresponding function and/or API calls to dependencies 480 that are generated during execution of application software 420. When the application software 420 generates function and/or API calls, application hooks 416, the wrappers and/or instrumented code intercept such calls and may perform other analysis or monitoring functions, such as reporting the entire call stack and/or arguments for selected functions within a binary, system libraries 482, application libraries 484, and/or a kernel. In various embodiments, application hooks 416 send the intercepted data as state information to a database (e.g., training data database). Additionally or alternatively, the application hooks 416 may facilitate monitoring of the application software 420 by a security constraint. For example, a security constraint on the computing device 402 having executable code may monitor the application software 420 and/or computing device 402 via the application hooks 416 and may perform various actions (e.g., mitigation actions such as process termination, etc.) based on detecting certain conditions (e.g., detecting a potential business logic attack, etc.). In some embodiments, the application hooks 416 facilitate detection of usage patterns and examination of function call stacks of each function and/or API call generated by application software 420. Additionally or alternatively, the application hooks 416 may facilitate injecting executable instructions into computing device 402. For example, the application hooks 416 may intercept calls generated by application software 420 and replace the intercepted calls with executable instructions associated with a security constraint.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of securing vulnerabilities in a program, the method comprising:
receiving, by a computer, state information generated by an application program;
training, by the computer, a constraints model based on the state information during execution of the application program;
generating, by the computer, one or more constraints with the constraints model based on a difference between the state information and expected state information, the constraints model configured to output the expected state information, each of the one or more constraints containing an execution constraint having a machine-readable instruction that prevents the application program from instructing the machine to deviate from a normal operation; and
applying, by the computer, the one or more constraints to the application program.

2. The computer-implemented method of claim 1, wherein applying the one or more constraints to the application program includes generating executable code for a processing device running the application program and transmitting the executable code to the processing device.

3. The computer-implemented method of claim 1, wherein the state information results from business logic of the application program.

4. The computer-implemented method of claim 3, wherein the state information comprises internal variables of the application program.

5. The computer-implemented method of claim 1, wherein the computer trains the constraints model with normal state information from the executed application program under normal operation.

6. The computer-implemented method of claim 1, wherein the one or more constraints address security vulnerabilities in a business logic of an application layer of the application program.

7. The computer-implemented method of claim 1, wherein the one or more constraints include at least one of an allowable range for an internal variable, an allowable state transition sequence, or an expected state dependent internal variable value.

8. A system for determining security vulnerabilities associated with an application program, the system comprising:
a non-transitory computer-readable storage medium having instructions stored thereon; and
a processor configured to execute the instructions to:
receive state information generated by an application program;
train a constraints model based on the state information during execution of the application program; and
generate one or more constraints with the constraints model based on a difference between the state information and expected state information, the constraints model configured to output the expected state information, each of the one or more constraints containing an execution constraint having a machine-readable instruction that prevents the application program from instructing the machine to deviate from a normal operation.

9. The system of claim 8, wherein the state information results from business logic of the application program.

10. The system of claim 9, wherein the state information comprises internal variables of the application program.

11. The system of claim 8, wherein the processor is further configured to train the constraints model with normal state information from the executed application program under normal operation.

12. The system of claim 8, wherein the one or more constraints address security vulnerabilities in a business logic of an application layer of the application program.

13. The system of claim 8, wherein the one or more constraints include at least one of an allowable range for an internal variable, an allowable state transition sequence, or an expected state dependent internal variable value.

14. The system of claim 8, wherein the processor is further configured to apply the one or more constraints to the application program.

15. The system of claim 14, wherein applying the one or more constraints to the application program includes generating executable code for a processing device running the application program and transmitting the executable code to the processing device.

16. A non-transitory computer-readable storage medium having instructions stored thereon that, when executed by a processor, cause the processor to:
receive state information comprising internal variables generated by an application program executed under normal conditions, wherein the internal variables are associated with a business logic of the application program;
train a constraints model based on the state information;
generate one or more constraints with the constraints model based on a difference between the state information and expected state information, the constraints model configured to output the expected state information, each of the one or more constraints describing an execution constraint for executing the application program, wherein the execution constraint includes at least one of an allowable range for an internal variable, an allowable state transition sequence, or an expected state dependent internal variable value;
generate executable code for a processing device running the application program based on the one or more constraints; and
transmit the executable code to the processing device.

17. The non-transitory computer-readable storage medium of claim 16, wherein the instructions further cause the processor to apply the one or more constraints to the application program.

18. The non-transitory computer-readable storage medium of claim 17, wherein applying the one or more constraints to the application program includes generating executable code for a processing device running the application program and transmitting the executable code to the processing device.

* * * * *